(12) United States Patent
Liu et al.

(10) Patent No.: US 9,292,963 B2
(45) Date of Patent: Mar. 22, 2016

(54) THREE-DIMENSIONAL OBJECT MODEL DETERMINATION USING A BEACON

(75) Inventors: Eric Liu, Santa Clara, CA (US); Stefan J. Marti, Santa Clara, CA (US); Seung Wook Kim, Cupertino, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 418 days.

(21) Appl. No.: 13/247,277

(22) Filed: Sep. 28, 2011

(65) Prior Publication Data

US 2013/0076860 A1 Mar. 28, 2013

(51) Int. Cl.
*H04N 13/02* (2006.01)
*G06T 15/20* (2011.01)

(52) U.S. Cl.
CPC ........... *G06T 15/205* (2013.01); *G06T 2200/08* (2013.01)

(58) Field of Classification Search
CPC ... H04N 13/02; G06T 2200/08; G06T 15/205
USPC .......................................................... 348/46
See application file for complete search history.

(56) References Cited

U.S. PATENT DOCUMENTS

| | | | |
|---|---|---|---|
| 7,701,457 B2 | 4/2010 | Bae | |
| 7,796,155 B1* | 9/2010 | Neely et al. .................... | 348/157 |
| 2003/0156189 A1* | 8/2003 | Utsumi et al. .................. | 348/77 |
| 2004/0070564 A1* | 4/2004 | Dawson et al. ................ | 345/156 |
| 2005/0105772 A1* | 5/2005 | Voronka et al. ............... | 382/103 |
| 2006/0095223 A1* | 5/2006 | Gordon et al. ................. | 702/116 |
| 2006/0227121 A1* | 10/2006 | Oliver ............................ | 345/179 |
| 2006/0255246 A1* | 11/2006 | Hetherington ................ | 250/216 |
| 2007/0061041 A1* | 3/2007 | Zweig ............................ | 700/245 |
| 2007/0238981 A1* | 10/2007 | Zhu et al. ....................... | 600/424 |
| 2007/0271011 A1* | 11/2007 | Lee et al. ........................ | 701/25 |
| 2008/0142919 A1* | 6/2008 | Shin .............................. | 257/435 |
| 2008/0192116 A1* | 8/2008 | Tamir et al. ................... | 348/157 |
| 2008/0291024 A1* | 11/2008 | Zhang et al. ............... | 340/572.1 |
| 2009/0259958 A1* | 10/2009 | Ban ................................ | 715/765 |
| 2009/0307623 A1 | 12/2009 | Agarawala et al. | |
| 2010/0103101 A1 | 4/2010 | Song et al. | |
| 2010/0188503 A1 | 7/2010 | Tsai et al. | |
| 2010/0315416 A1* | 12/2010 | Pretlove et al. ............... | 345/419 |
| 2011/0055049 A1 | 3/2011 | Harper et al. | |
| 2011/0074932 A1 | 3/2011 | Gharib et al. | |
| 2011/0102550 A1* | 5/2011 | Daniel et al. ................... | 348/46 |
| 2011/0205068 A1* | 8/2011 | Huynh et al. ............... | 340/573.1 |
| 2011/0282578 A1* | 11/2011 | Miksa et al. ................... | 701/208 |
| 2011/0320134 A1* | 12/2011 | Butler et al. .................... | 702/25 |
| 2012/0050316 A1* | 3/2012 | Rainisto et al. ............... | 345/619 |
| 2012/0120072 A1* | 5/2012 | Se et al. ......................... | 345/420 |
| 2013/0051672 A1* | 2/2013 | Robinson et al. ............. | 382/173 |

OTHER PUBLICATIONS

Baozhang, L. et al; The Model for a Laser Distance Tracking 3D Coordinates Vision Measuring System; http://ieeexplore.ieee.org/xpls/abs_all.jsp?arnumber=5647765 > On pp. 1699-1703 ; Oct. 18, 2010.

Huang, F. et al.; The Model and its Solution's Uniqueness of a Portable 3D Vision Coordinate Measuring System; http://ieeexplore.ieee.org/xpl/freeabs_all.jsp?arnumber=5405616 > On pp. 1-6; vol. 7634; Nov. 6, 2009.

\* cited by examiner

*Primary Examiner* — Jay Patel
*Assistant Examiner* — Joseph Suh
(74) *Attorney, Agent, or Firm* — Kilpatrick Townsend & Townsend LLP

(57) ABSTRACT

Example embodiments disclosed herein relate to determining relationships between locations based on beacon information. At least three sensors of a device can be used to determine locations of a beacon. The device can determine a three-dimensional relationship between the locations.

18 Claims, 4 Drawing Sheets

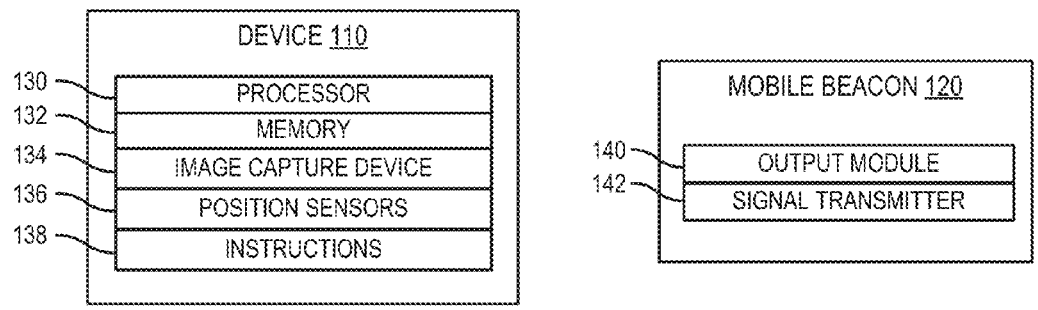
*FIG. 1A*
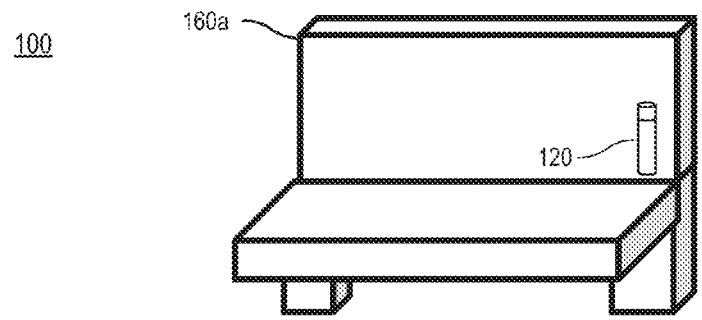
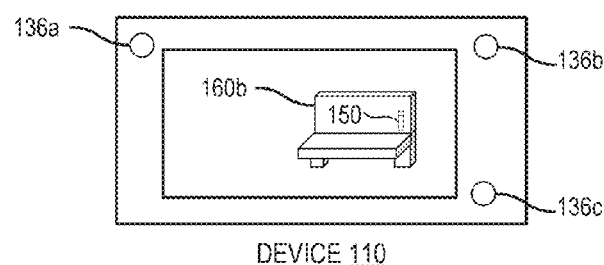
*FIG. 1B*

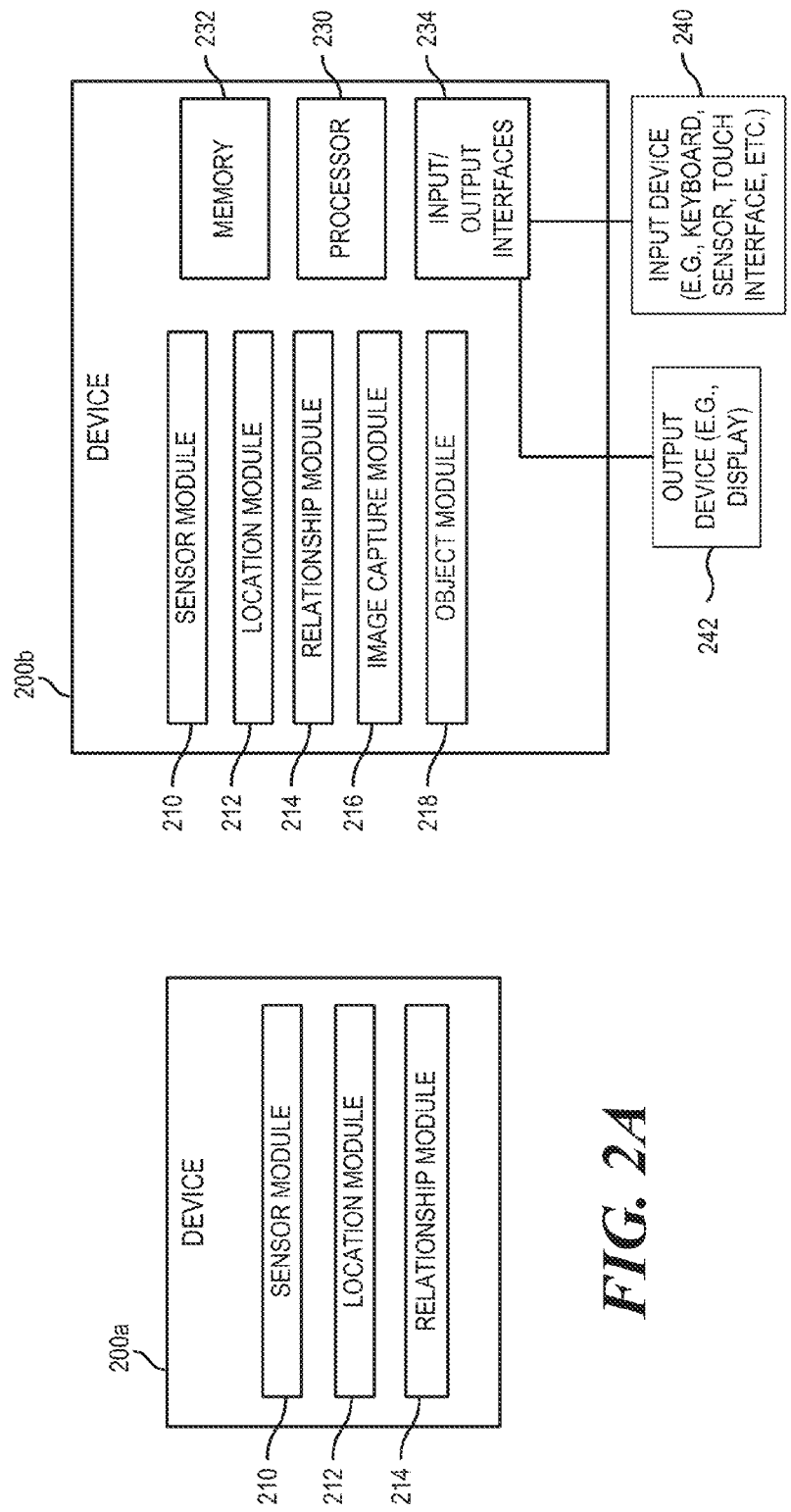

THREE-DIMENSIONAL OBJECT MODEL DETERMINATION USING A BEACON

BACKGROUND

Three-dimensional modeling can be a tool used to deliver quality and value to consumers of services and manufactured devices. Various approaches are available to perform three-dimensional modeling. For example, three-dimensional models can be created manually or automatically using tools. However, these tools can be tedious to use or imprecise.

BRIEF DESCRIPTION OF THE DRAWINGS

The following detailed description references the drawings, wherein:

FIGS. 1A and 1B include block diagrams of a system capable of determining a three-dimensional model of an object based on a beacon, according to various examples;

FIGS. 2A and 2B are block diagrams of devices capable of determining three-dimensional relationships of locations based on a beacon, according to various examples;

DETAILED DESCRIPTION

Figure 3:
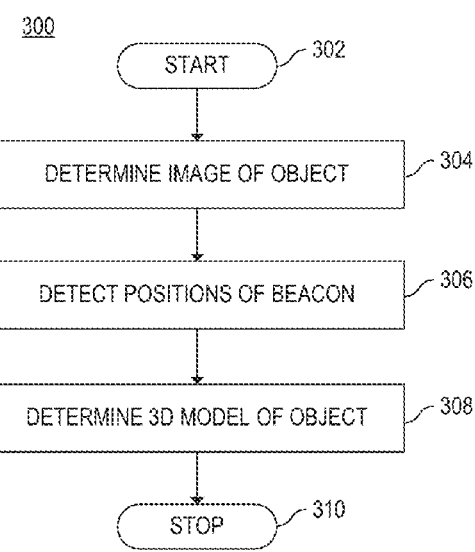
FIG. 3 is a flowchart of a method for determining a three-dimensional model of an object, according to one example.

Capturing three-dimensional (3D) data of real world objects is challenging for consumers. Example challenging issues include availability of technology, mobility of technology, and cost of technology to accurately generate a digital 3D object that represents a real world object. Devices that are used daily, such as mobile devices, are currently limited to capturing two-dimensional (2D) images and video, for example, by using camera sensors. The 2D data does not include actual dimensions or depth data. As such, 2D data by itself it is not very useful for accurate 3D modeling.

Depth sensors are available; however, depth sensors are expensive and generally offer low resolution. Other technologies, such as professional 3D scanning equipment using structured light and optical and/or physical measurements to create 3D models from real world objects are expensive, bulky, and stationary.

Accordingly, various embodiments disclosed herein relate to pairing a device with sensors with a mobile beacon to correlate the position of an object in 3D space. The size, dimensions, and position of the object or multiple objects relative to the sensors can be determined by touching the mobile beacon to the target object and providing a signal to the device. The device can then determine the location of the beacon based on the signal.

In one embodiment, the device can be used to take a picture of a target object. The device may include at least three sensors that can pick up a signal from the mobile beacon. The target object in the image can be represented as a digital object. Further, the device can determine one or more sections of the digital object in the picture to retrieve position information about. The determination can be automatic, for example, by processing the picture using edge detection or saliency. Further, the determination can be manual by allowing a user to select places on the digital object to retrieve position information about. The selection and/or the processed determination can be shown on the picture in a viewing apparatus associated with the device.

The mobile beacon can then, in the real world, be placed at the corresponding location to the portion selected. The mobile beacon then sends a signal to the device. The device can have multiple sensors, for example, three or more sensors, located at different parts of the device. The amount of time it takes for the signal to come from the mobile beacon to each of the devices can be processed to determine the location of the mobile beacon relative to the device. Multiple portions of the picture can be selected and multiple beacon signals can be used to determine the depth of multiple sections of the picture. This information can be used to determine a 3D model of the real world target object.

FIGS. 1A and 1B include block diagrams of a system capable of determining a three-dimensional model of an object based on a beacon, according to various examples. The system 100 can include a device 110 that can interact with a mobile beacon 120. In some examples, the mobile beacon 120 can also act as an input device to the device 110. In certain examples, the device 110 and/or the mobile beacon 120 are computing devices, such as a mobile phone, a laptop device, a tablet device, combinations thereof, etc. In certain embodiments, the device 110 can include a processor 130, memory 132, an image capture device 134, position sensors 136, and instructions 138 to control the processor 130. Further, the mobile beacon 120 can include an output module 140 to provide input to the device 110 and a signal transmitter 142 that can provide a signal to one or more of the position sensors 136 of the device 110. Further, the signal transmitter 142 can be capable of transmitting one or more different types of signals.

Processor 130 may be, at least one central processing unit (CPU), at least one semiconductor-based microprocessor, at least one graphics processing unit (GPU), other hardware devices suitable for retrieval and execution of instructions 138 stored in memory 132, such as a machine-readable storage medium, or combinations thereof. For example, the processor 130 may include multiple cores on a chip, include multiple cores across multiple chips, multiple cores across multiple devices (e.g., if the device 110 includes multiple node devices), or combinations thereof. Processor 130 may fetch, decode, and execute instructions 138 to implement tasks such as the processes for FIGS. 3-5. As an alternative or in addition to retrieving and executing instructions, processor 130 may include at least one integrated circuit (IC), other control logic, other electronic circuits, or combinations thereof that include a number of electronic components for performing the functionality of instructions 138.

In certain examples, machine-readable storage medium may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium may be encoded with a series of executable instructions for determining a 3D model and/or 3D relationships.

The image capture device 134 can be a device with an image sensor that converts an optical image into an electronic signal. As such, 2D images can be captured from a real world environment. Examples of image capture devices 134 include digital cameras, webcams, camcorders, etc. These image capture devices 134 can take still photographs and/or video. In certain examples, video can be considered multiple sequenced images that represent a scene. Various types of files can be used to store the digital representation such as video and/or still image encoded or raw file representations. An example of such a representation is a bitmap file.

The position sensors 136 can receive a signal from the mobile beacon 120 to determine a relationship between the mobile beacon 120 and the device 110. In certain examples, a position sensor is a device that can be used to determine information that can be processed to determine the location of the mobile beacon 120. In one example, the device 110 can remain stationary while the mobile beacon 120 moves to one or more selected areas of the target object and sends a signal via a signal transmitter 142 from those areas. As noted above, the location of the mobile beacon 120 can be synchronized with an image. The image can be captured via the image capture device 134. A stable location of the device 110 can be used as a reference point to multiple locations of the mobile beacon.

Further, an output module 140 of the mobile beacon 120 can be used to select a portion of the image presented on the device 110 that corresponds to the location of the mobile beacon 120. In one example, the mobile beacon 120 can also act as a pen or stylus input to the device 110. As such, in certain examples, the output module 140 can emit magnetic pulses or other information to provide selection input to the device 110. In another example, the mobile beacon 120 may act as another type of input (e.g., a wireless pointer input) to the device 110.

The signal transmitter 142 and the position sensors 136 of the mobile beacon 120 can be implemented via various technologies. For example, the signals used can include ultrasound signals, radio frequency signals, visible light signals, magnetic field signals, infrared signals, combinations thereof, or the like. As shown in FIG. 1B, the position sensors 136a-136c can be placed on differing parts of the device 110. Further, at least three position sensors 136 can be used. Because the locations of the sensors are fixed on the device 110, the device 110 can calculate the delay in time between when a signal from the mobile beacon 120 is received at each of the position sensors 136a, 136b, 136c. This can be used to determine the position of the mobile beacon 120 as compared to the device 110. This information can be correlated to the selected area 150 of the object 160a. A digital representation 160b of the object can be shown to the user. Various approaches can be used to determine the location of the mobile beacon 120. In one example, multilateration is used. In this example, four or more sensors are used to determine the location of the mobile beacon 120 as further discussed below.

In certain examples, the device 110 can also include inertial sensors such as accelerometers, gyroscopes, etc. These sensors can keep track of movement of the device 110. As such, movements of the device 110 can be accounted for as location of multiple portions of the object 160 are determined using the mobile beacon 120 and the device 110. Further, the orientation of the device 110 can be determined based on the force of gravity acting on an accelerometer.

In one embodiment, the processor 130 can execute the instructions 138 to determine a plurality of images via the image capture device 134. The images can be considered a sequential stream of images. The processor 130 can be caused by the instructions 138 to determine an object 160 in the images. The object 160 can be selected based on one or more criteria. For example, the object 160 can be selected based on an input by the user or based on a process executed by the processor 130. For example, salient features (e.g., color, edges, changes in color, etc.) of the object 160 and/or the closeness of the object 160 to the middle of the images can be used to determine the object 160 and/or to present one or more objects in the images for selection by a user. In certain examples, salient features are features that make the object 160 stand out. In this example, the object 160 is a bench. A bench is used for illustrative purposes; however other objects can be used. Further, in certain examples, structures such as rooms can be determined as objects.

In this embodiment, the mobile beacon 120 can be captured in the images. A representation of mobile beacon 120 can be determined via an image analysis of the images. As such, the processor 130 can recognize the mobile beacon 120 in the images. A portion of at least one of the images can be determined based on the recognition. This portion can include, for example, the selected area 150. As such, the selected area 150 can be determined based on the location of the mobile beacon 120 in the image. In certain examples, the reception of the signal at the position sensors 136 can be used to trigger the determination of the selected area 150. The recognition of the mobile beacon 120 can be based on a physical marking of the mobile beacon 120, saliency of the mobile beacon 120, other image processing, combinations thereof, etc.

The device 110 then receives signal information about at least one signal received at the position sensors 136 from the mobile beacon 120. In certain examples, multiple signals can be sent by the mobile beacon 120 and received by the device 110. As noted above, differences in the locations of the position sensors 136 are known and the location of the mobile beacon can be determined by triangulating or other calculations. The calculations can be based on the differences in time between when the signal was received at each of the position sensors 136a-136c. Various technologies can be used in triangulation or multilateration of the signal sent to the position sensors 136. As such, the processor 130 can determine spatial location information about the mobile beacon 120. The spatial location information corresponds to the portion that represents the selected area 150 that was based on the recognition. One technology capable of generating the spatial location information is multilateration or hyperbolic positioning. Multilateration is the process of locating the mobile beacon 120 by computing the time difference arrival (TDOA) of a signal emitted from the mobile beacon 120 to four or more position sensors 136 or receivers.

In one embodiment, the signal transmitter 142 of the mobile beacon 120 can continuously send out signals. The signals can include identification information (e.g., a number associated with each packet). The position sensors 136 can receive the signals and processor 130 can store a buffer in the memory 132 including the identification information and associated time stamps. The mobile beacon 120 can send a coded trigger using the signal transmitter. When this trigger is received by the device 110, the buffered information can be used to determine the location of the mobile beacon 120. In some examples, the buffer used can continue to after a threshold amount of time after the trigger message is received.

The processor 130 can then be caused to determine a three-dimensional model of the object 160 based, at least in part, on the spatial location information. In certain examples, multiple locations of parts of the object 160 can be determined using this process. For example, the instructions 138 can cause the processor 130 to determine another portion of at least another one of the images. The portion can be determined based on a new location (not shown) of the mobile beacon 120. Further, an image analysis can be used to determine the portion. The position sensors 136 can then receive other signal information about at least another signal received via the position sensors 136 from the mobile beacon 120 at the new location. The processor 130 determines other spatial location information about the mobile beacon 120 that corresponds to the other portion of the images. As noted above, the spatial location information can be determined based on multilateration. The 3D model can thus use spatial information collected from multiple locations of the mobile beacon 120. Further, the spatial location information can be correlated to parts of the digital object based on one or more processed images. In certain examples, generating the 3D model can be based on a process that extracts features (e.g., edges and/or salient features) of the object and then coordinates between these features and the locations of the mobile beacon to process and add additional depth information and/or 3D location information. In certain examples, incomplete models can be generated if parts of the object 160 are not imaged and/or spatial information about one or more sections of the object 160 are not determined. Further, in certain examples, the 3D model can include texture based on the images.

In another embodiment, a room or an object with a spatial cavity can be determined. For example, a user can capture an image of an outdoor garage or other structure in a mode for determining a room or building object. The device 110 can request that the user place the mobile beacon 120 at particular points of the structure (e.g., the corners of the room, the ceiling, the floor, combinations thereof, etc.). Location information can be gathered from each of the points of the structure. As such, the device 110 can determine a 3D volume associated with the room and structure. In certain scenarios, objects can be uploaded to a database via a network connection. In certain examples, the device 110 may also include a sensor that can allow the device 110 to ascertain its geolocation. As such, the objects can be associated with particular locations.

FIGS. 2A and 2B are block diagrams of devices capable of determining three-dimensional relationships of locations based on a beacon, according to various examples. Devices 200a, 200b include components that can be utilized to determine three-dimensional relationships based on a mobile beacon. The respective devices 200a, 200b may be a mobile device, notebook computer, a desktop computer, a tablet computing device, a wireless device, a cellular phone, a workstation, or any other computing device that can be connected to sensors capable of receiving signals from the mobile beacon. In certain examples, the device 200a can include a sensor module 210, a location module 212, and a relationship module 214. Further, the device 200 can be broken into separate devices that can used together as the device 200.

The sensor module 210 can be used to control multiple sensors. In certain examples, at least three sensors are used. The sensors can be included in the sensor module 210 or be attached using an interface, for example, an input/output interface 234. In certain examples, the sensors are receivers. For example, the sensors can be receivers or transceivers of signals. The sensors can be physically located in a manner such that the sensors do not form a straight line. Further, the location of the sensors relative to each other can be known to the device 200.

The location module 212 can determine a plurality of locations of a beacon using the sensors. The determination can be based on multiple signals that are respectively received from the beacon at the locations. For example, a user may place the beacon at a first location and initiate a signal to be sent by the beacon. The signal can be received by the sensors to generate sensor information. The sensor information can be used to determine a location of the beacon based on multilateration, trilateration, combinations thereof, or other technologies/approaches. This approach can be used to determine the locations of the beacon while the device 200 is stationary. Further, if the device 200 is not stationary, one or more other sensors (e.g., gyroscopes, accelerometers, etc.) can be used to compensate for changes of the location of the device 200 while determining the locations of the beacon. A reference point can be selected that is stable to base locations from. In some examples, the reference point can be an initial location of the device 200a or one of the sensors. Location information can be stored with the reference point as a baseline.

The relationship module 214 can determine three-dimensional relationships between the locations of the beacon. In one example, a three-axis accelerometer can be included in the device 200. When stationary, this can provide orientation compared to the known dimensions of the device and locations of the sensors based on gravity. As such, locations of the beacon can be determined and stored as X, Y, Z coordinates. In one example, if two locations are determined, the X, Y, Z coordinates of the locations of the beacon can be used to determine a vector, distance, etc. between the coordinates. As noted above, a reference point can be used to provide a baseline.

In certain embodiments, the device 200 includes an image capture module 216. The image capture module 216 can be used to capture an image of an object. The locations of the beacon can be correlated to the image of the object. In some examples, the device 200 does not include the image capture module 216, but the device 200 receives the image via another method (e.g., via a communication network or via a transfer device).

An object module 218 can generate a three-dimensional object model for the object based on the image, the locations, and selected portions of the image. In certain embodiments, the object module 218 can determine multiple portions of the object. The portions can be determined via a selection input or via an automated dynamic method (e.g., using image processing to determine possible locations of features of the object that may be associated with a depth). The locations can correspond to the portions. In one embodiment, a portion is an area or point of the image.

A processor 230, such as a central processing unit (CPU) or a microprocessor suitable for retrieval and execution of instructions and/or electronic circuits can be configured to perform the functionality of any of the modules 210-214 described herein. In certain scenarios, instructions and/or other information, such as location information or relationship information, modeling information, etc., can be included in memory 232. Input/output interfaces 234 may additionally be provided by the device 200b. For example, input devices 240, such as a keyboard, a sensor, a touch interface, a mouse, a microphone, etc. can be utilized to receive input from an environment surrounding the device 200b. Further, an output device 242, such as a display, can be utilized to present information to users. Examples of output devices include speakers, display devices, amplifiers, etc. Moreover, in certain embodiments, some components can be utilized to implement functionality of other components described herein.

Each of the modules 210-214 may include, for example, hardware devices including electronic circuitry for implementing the functionality described herein. In addition or as an alternative, each module 210, 212, 214 may be implemented as a series of instructions encoded on a machine-readable storage medium of device 200 and executable by processor 230. It should be noted that, in some embodiments, some modules are implemented as hardware devices, while other modules are implemented as executable instructions.

In one embodiment, an image of an object is captured via the image capture module 216. The image can be processed for points or portions that may be associated with salient features. Additionally or alternatively, a user input can be used to select one or more of the portions. For example, the beacon can also be an input device, such as a stylus input to a display of the device 200. In one scenario, the beacon can be used to select one or more of the portions. Then, the beacon can be placed at the physical locations corresponding to the one or more portions. This can be done sequentially.

In one example, the beacon can select one portion, the user can place the beacon at the physical location corresponding to the portion, and the beacon can send a signal to allow the location module 212 determine a digital location to associate with the portion. With this approach, the portion corresponds to the physical location and the location is based on the signal.

In another example, the beacon can be used to select multiple portions in an order (e.g., select a first portion, then a second portion, a third portion, etc.). Then, the beacon can send signals sequentially from each of the locations. In some embodiments, one signal is used for each location. In other embodiments, multiple signals are sent by the beacon at each location and processed by the device 200. Multiple signals can be used to synchronize clocks between the beacon and the device 200 and/or to provide additional information for more precise location calculations. In certain embodiments, the portions need not be selected by the beacon or may be automatically selected and/or ordered for when to receive a location signal from the beacon.

The object module 218 can create a 3D model of the physical object using the locations of the beacon and/or image processing of the image. In certain scenarios, multiple images can be used to provide information about multiple angles of the physical object. In some scenarios, the 3D model is generated and skinless. In other scenarios, the 3D model can include texture from the image or images. One or more processes and computer vision techniques can be used to map the image(s) to the 3D model.

FIG. 3 is a flowchart of a method for determining a three-dimensional model of an object, according to one example. Although execution of method 300 is described below with reference to device 200b, other suitable components for execution of method 300 can be utilized (e.g., device 200a, device 110, etc.). Additionally, the components for executing the method 300 may be spread among multiple devices. Method 300 may be implemented in the form of executable instructions stored on a machine-readable storage medium and/or in the form of electronic circuitry.

Method 300 may start at 302 and proceed to 304, where device 200b may determine an image of an object. An image capture module 216 of the device 200b can be used to generate the image of the object. Additionally or alternatively, the image may be taken via another device (e.g., a digital camera), and received via an input/output interface 234 (e.g., via an internet connection, a memory card, a peripheral device, etc.).

At 306, the device 200b, via the sensor module 210, can detect multiple positions of a beacon. The positions can be respectively associated with multiple portions of the image. Coordination between the beacon locations and the portions of the image can be accomplished in various manners, for example, using the methods of FIG. 4 or 5. For each location, the beacon can output a signal or multiple signals that can enable the device 200b to determine spatial information about the location of the beacon. The device's sensor module 210 can receive the signal(s). As noted, the sensor module 210 can include at least three sensors to triangulate the position(s) of the beacon. Other technologies can be used to determine the position(s) of the beacon such as multilateration or trilateration. Each technology can store information about the signal. Multiple signals can be used to determine a more precise location. Further, in certain scenarios, one of the signals can include a synchronization signal to synchronize at least one clock on the beacon and at least one clock on the device 200b.

In the example of multilateration, the amount of time it takes for the signal to be received at each of the sensors can be stored and used to determine the location of the beacon. This information can be used, for example, to determine a time difference of arrival of the signal at the receiving sensors. A signal or pulse emitted from the beacon will arrive at slightly different times at spatially separated receiving sensors. The delays between two sensors can be correlated to determine a hyperboloid of possible locations of the beacon. The delays between another pair of the sensors can provide another hyperboloid of possible locations. The intersection of the two hyperboloids describes a curve on which the beacon can lie. A third delay measurement can then be used to find the location of the beacon in 3D. The location can be an intersection of the curve and another hyperboloid created by the third delay measurement. In the scenario of multilateration, N number of receiving sensors can provide N−1 hyperboloids. As such, at least four sensors may be used to determine the location of the beacon in 3D. Additional receiving sensors can be used to provide better accuracy. Other information can be used to more accurately determine the location of the beacon.

Then, at 308, an object module 218 can determine a 3D model of the object based on the positions and the image. Computer vision processing of the image can be performed to determine an estimated 3D model. Then, the location information about the beacon and the associated portions of the image can be mapped to the estimated 3D model. In certain scenarios, the image can be used to add texture to the 3D model. At 310, the method 300 stops. Other processes of the device 200b can continue.

Figure 4:
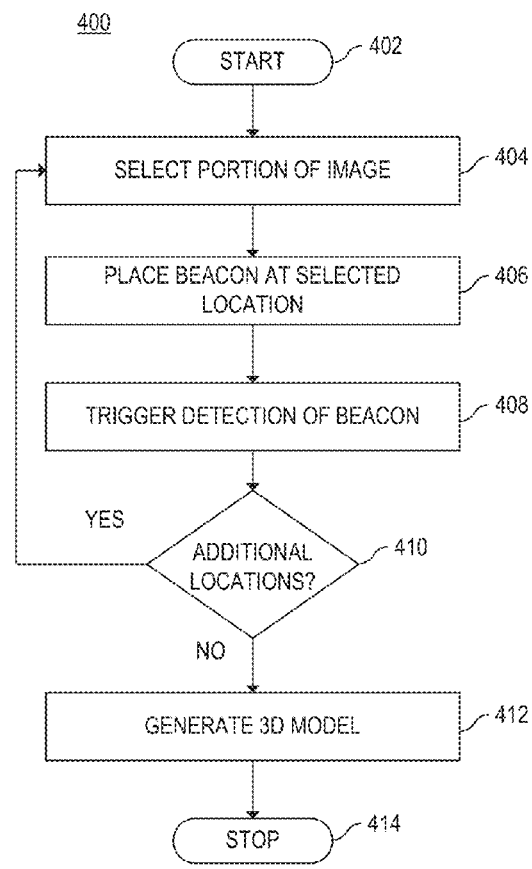
FIG. 4 is a flowchart of a method for generating a three-dimensional model of an object based on selected beacon locations, according to one example.

FIG. 4 is a flowchart of a method for generating a three-dimensional model of an object based on selected beacon locations, according to one example. Although execution of method 400 is described below with reference to device 200b, other suitable components for execution of method 400 can be utilized (e.g., device 200a, device 110, etc.). Additionally, the components for executing the method 400 may be spread among multiple devices. Method 400 may be implemented in the form of executable instructions stored on a machine-readable storage medium and/or in the form of electronic circuitry.

Method 400 may start at 402, where the device 200b can be in a state where the device 200b has an image of an object to generate a 3D model of. The method 400 can proceed to 404, where a portion or section of the image is selected. In certain examples, the portion can be selected via an automated process, an automated process can provide selection portion recommendations, the portion can be selected by an input, or combinations thereof. For example, the image can be processed via a visual analysis to determine one or more of the portions. In another example, a beacon can include selection capabilities to select a portion of the image. The device 200b can include a touch screen input capability. Further, the beacon can be an input pen device to provide the selection input. As such, a user of the device 200b can quickly and easily select a portion of the object on the image.

At 406, the beacon can be placed at the real world physical location associated with the selected portion. A user can physically change the position of the beacon. In certain scenarios, the beacon can have a button or other trigger mechanism to coordinate with the device 200*b*. As such, at 408, the beacon can trigger the sending of a signal to the device 200*b*. The device 200*b* can receive the signal from the beacon at three or more sensors or receivers. In certain scenarios, the detection can include a two part signal. A first part of the signal can be a speed of light signal (e.g., radio frequency, infrared, wired, etc.) and a second part of the signal can be a sound based signal (e.g., ultrasound). The sensors can receive one or more of the types of signals. Further, in certain scenarios, when the light speed signal is received at one or more of the sensors, a clock can be started to determine the amount of time it takes for the sound based signal to be received. The time delay between the reception of the light speed signal and the speed of sound signal can be used in triangulation or trilateration to determine the location of the beacon.

In certain embodiments, multiple portions can be selected and multiple locations of the beacon can be determined. When other locations are determined, the device 200*b* can remain stationary or movements of the device 200*b* can be tracked to determine its position in a 3D environment compared to the locations of the beacon. In some examples, before the first location of the beacon is determined, a baseline location of the device 200*b* can be set. One or more motion sensors (e.g., accelerometers, gyroscopes, etc.) can be used to determine movement of the device 200*b* relative to the baseline location.

The method 400 can proceed to 410, where the device 200*b* can determine if additional portions should be selected. This can be based on an input, based on a previously determined amount of portions, or the like. In one example, if the user selects another portion of the image, an additional location is determined. In this example, the method 400 returns to 404 and can continue from that point. In other examples, if no portions remain, the user selects that there are no more locations, or the like, the method 400 proceeds to 412, where the object module 218 generates a 3D model of the object. The object can be generated by using the locations of the beacons and corresponding image locations as well as processing of the image. At 414, the method 400 stops. The device 200*b* can proceed to perform other tasks, such as using, storing, or transmitting the 3D model.

Figure 5:
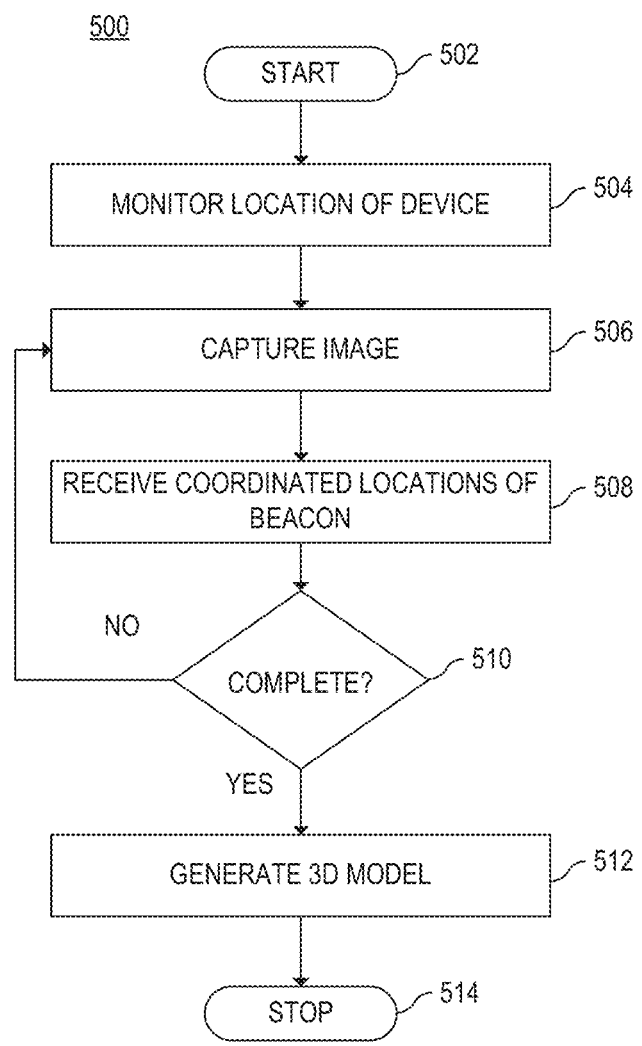
FIG. 5 is a flowchart of a method for generating a three-dimensional model of an object at a mobile device based on location information of the mobile device and a beacon, according to one example.

FIG. 5 is a flowchart of a method for generating a three-dimensional model of an object at a mobile device based on location information of the mobile device and a beacon, according to one example. Although execution of method 500 is described below with reference to device 200*b*, other suitable components for execution of method 500 can be utilized (e.g., device 200*a*, device 110, etc.). Additionally, the components for executing the method 500 may be spread among multiple devices. Method 500 may be implemented in the form of executable instructions stored on a machine-readable storage medium and/or in the form of electronic circuitry. In this scenario, the device 200*b* can be a mobile device.

Method 500 may start at 502, where the device 200*b* can be in a state where the device 200*b* is ready to initiate generation of a 3D model of an object. As such, a program or application can be executing on the device 200*b* to track the location of a beacon or multiple beacons to correlate features of a physical object with the generation of a virtual 3D object.

At 504, sensors of the device 200*b* can be used to monitor the location of the device 200*b*. A baseline can be started by the device 200*b* in a manner such that the location of the device 200*b* at the time the baseline was initiated is a reference location from which other movements of the device 200*b* can be coordinated from.

At 506, the device 200*b* can capture an image via an image capture module 216. In certain examples, the image capture device can capture multiple images or receive a stream of live images. Coordinated locations of the beacon can be received at 508. These locations can be mapped to portions of the image as detailed above. More than one location of the location can be determined in this manner.

At 510, the device 200*b* determines whether image capture and/or beacon location determination is complete. This can be based on user input. If the image capture is not complete, the process 500 returns to 506. The location of the device 200*b* can be determined to change. This can occur, for example, if a user of the device 200*b* moves the device to capture an image of the object from another angle. The location can continue being monitored. Further, another image of the object can be captured at 506. Additionally, coordinated positions of the beacon can be determined at 508 based on selected portions of the other image. As such, another position of the beacon that is associated with first portion of the other image can be determined. Additional beacon positions associated with other portions of the image can also be determined. The location and viewing angle of the device 200*b* can be accounted for in the location information associated with the beacon.

The method 500 can continue to 510. If the image capture and/or the beacon determination is complete, the object module 218 generates a 3D model of the object using the beacon location information and image information (512). With this approach additional beacon positions can be added and additional texture information of the object can be used to add texture to the 3D model. Then, at 514, the method 500 stops.

What is claimed is:

1. A method comprising:
   obtaining a two-dimensional (2D) image of a physical scene using a camera, wherein the camera is coupled to a device, and the 2D image of the physical scene includes a 2D image of a physical object;
   selecting a portion of the 2D image of the physical object;
   detecting a three-dimensional (3D) position of a beacon at the device, wherein after selecting the portion of the 2D image, the beacon is placed in the physical scene at a corresponding location to the selected portion of the physical object;
   associating the position of the beacon with the portion of the 2D image of the physical object; and
   determining, at the device, a three-dimensional (3D) model of the physical object based on the association of the position of the beacon with the portion of the 2D image of the physical object.

2. The method of claim 1, wherein the beacon is an input device to the device, the method further comprising:
   selecting the portion of the 2D image of the physical object from the 2D image of the physical scene using the beacon;
   triggering the detection of the position of the beacon,
   wherein the position of the beacon corresponds to the portion of the 2D image of the physical object.

3. The method of claim 2, wherein the input device is a pen device that selects the portion of the 2D image of the physical object from the 2D image of the physical scene as a touch screen input to the device.

4. The method of claim 1, further comprising:
   processing the image to determine the portion of the 2D image of the physical object from the 2D image of the physical scene based on a visual analysis.

5. The method of claim 1, wherein the beacon includes an output signal and wherein the device includes at least three sensors to triangulate the position of the beacon.

6. The method of claim 5, wherein the output signal includes at least one of:
an ultrasound signal,
a radio frequency signal, a visible light signal, magnetic field signal,
and an infrared signal.

7. The method of claim 5, wherein the position of the beacon include three-dimensional coordinates and wherein the three-dimensional model includes texture mapped from the image.

8. The method of claim 5, further comprising:
monitoring a location of the device;
determining that the location of the device has changed;
determining another 2D image of the physical object; and
detecting another position of the beacon that is associated with a portion of the other 2D representation of the physical object from the 2D image,
wherein the 3D model is further based on the other position.

9. The method of claim 5, wherein the device further includes an accelerometer to determine the position of the beacon.

10. The method of claim 5, wherein the sensors in the device do not form a straight line.

11. The method of claim 1, wherein selecting the portion of the 2D image of the physical object from the 2D image of the physical scene comprises processing the image to automatically detect features associated with the portion of the 2D image of the physical object from the 2D image of the physical scene.

12. A computing system comprising:
a device including:
an image capture device;
at least three position sensors;
a processor coupled to memory; and
a mobile beacon that can provide input to the device, the mobile beacon including a signal transmitter,
wherein the processor is configured to:
determine a plurality of two-dimensional (2D) images of a physical scene via the image capture device;
determine a physical object in the 2D images of the physical scene using visual characteristics of the physical object;
recognize the mobile beacon in the images;
determine a portion of a 2D image of the physical object from at least one of the 2D images of the physical scene based on the recognition;
receive signal information about at least one signal received at the at least three position sensors from the mobile beacon;
determine three-dimensional (3D) spatial location information about the mobile beacon, after determining the portion of the 2D image of the physic object, wherein the 3D spatial location information corresponds to the portion of the 2D image of the physical object; and
determine a three-dimensional (3D) model of the object based, at least in part, on the 3D spatial location information.

13. The computing system of claim 12, wherein the processor is further configured to:
determine another portion of at least another one of the 2D images;
receive another signal information about at least another signal received at the at least three position sensors from the mobile beacon;
determine another 3D spatial location information about the mobile beacon wherein
the other 3D spatial location information corresponds to the other portion of 2D image of the physical object,
wherein the three-dimensional model is further based on the other 3D spatial location information.

14. The computing system of claim 12, wherein the at least one signal is used to trigger the determination of the portion.

15. A device comprising:
an image capture module to capture a two-dimensional (2D) image of a physical scene using a camera, the 2D image of the physical scene including a 2D image of a physical object;
a location module to determine a three-dimensional (3D) position of a beacon at the device, wherein after using the device to select a portion of the 2D image of the physical object, the beacon is placed in the physical scene at a corresponding location to the selected portion of the 2D image of the physical object;
a relationship module to associate the position of the beacon with the portion of the 2D image of the physical object; and
an object module to determine, at the device, a three-dimensional (3D) model of the physical object based on the association of the position of the beacon with the portion of the 2D image of the physical object.

16. The device of claim 15,
wherein the beacon is an input device to the device;
wherein the portion of the 2D image of the physical object is selected from the 2D image of the physical scene using the beacon; and
wherein the position of the beacon corresponds to the portion of the 2D image of the physical object.

17. A non-transitory machine-readable storage medium encoded with instructions executable by a processor of a computer, the machine-readable medium comprising:
instruction to obtain a two-dimensional (2D) image of a physical scene using a camera, wherein the camera is coupled to a device, and the 2D image of the physical scene includes a 2D image of a physical object;
instruction to select a portion of the 2D image of the physical object;
instruction to detect a three-dimensional (3D) position of a beacon at the device, wherein after selecting the portion of the 2D image, the beacon is placed in the physical scene at a corresponding location to the selected portion of the physical object;
instruction to associate the position of the beacon with the portion of the 2D image of the physical object; and
instruction to determine, at the device, a three-dimensional (3D) model of the physical object based on the association of the position of the beacon with the portion of the 2D image of the physical object.

18. A system comprising:
means for obtaining a two-dimensional (2D) image of a physical scene using a camera, wherein the camera is coupled to a device, and the 2D image of the physical scene includes a 2D image of a physical object;
means for selecting a portion of the 2D image of the physical object;
means for detecting a three-dimensional (3D) position of a beacon at the device, wherein after selecting the portion of the 2D image, the beacon is placed in the physical scene at a corresponding location to the selected portion of the physical object;

means for associating the position of the beacon with the portion of the 2D image of the physical object; and means for determining, at the device, a three-dimensional (3D) model of the physical object based on the association of the position of the beacon with the portion of the 2D image of the physical object.

* * * * *